(12) United States Patent
Huang

(10) Patent No.: US 8,736,569 B2
(45) Date of Patent: May 27, 2014

(54) TOUCHSCREEN WITH A LIGHT MODULATOR

(75) Inventor: Andrew Shane Huang, Cardiff, CA (US)

(73) Assignee: BBY Solutions, Inc., Richfield, MN (US)

( * ) Notice: Subject to any disclaimer, the term of this patent is extended or adjusted under 35 U.S.C. 154(b) by 63 days.

(21) Appl. No.: 13/609,889

(22) Filed: Sep. 11, 2012

(65) Prior Publication Data

US 2013/0063358 A1 Mar. 14, 2013

Related U.S. Application Data

(63) Continuation of application No. 12/983,212, filed on Dec. 31, 2010, now Pat. No. 8,411,069, which is a continuation of application No. 12/854,174, filed on Aug. 11, 2010, now Pat. No. 7,876,288.

(60) Provisional application No. 61/331,395, filed on May 5, 2010.

(51) Int. Cl.
*G06F 3/041* (2006.01)
*G06F 3/042* (2006.01)

(52) U.S. Cl.
USPC .......................................... 345/173; 345/175

(58) Field of Classification Search
USPC .................................................. 345/173, 175
See application file for complete search history.

(56) References Cited

U.S. PATENT DOCUMENTS

| | | |
|---|---|---|
| 5,389,951 A | 2/1995 | Baker |
| 6,020,945 A | 2/2000 | Sawai et al. |
| 6,411,344 B2 | 6/2002 | Fujii et al. |
| 6,611,299 B1 | 8/2003 | Fujii et al. |
| 7,218,315 B2 | 5/2007 | Takeuchi et al. |
| 7,301,591 B2 | 11/2007 | Akiyama |
| 7,742,290 B1 | 6/2010 | Kaya |
| RE41,678 E | 9/2010 | Kubo et al. |
| 7,833,588 B2 | 11/2010 | Mikoshiba et al. |
| 7,876,288 B1 | 1/2011 | Huang |
| 2005/0018106 A1 | 1/2005 | Wang et al. |
| 2006/0097991 A1 | 5/2006 | Hotelling et al. |
| 2006/0183505 A1* | 8/2006 | Willrich ........................ 455/566 |
| 2007/0063982 A1 | 3/2007 | Tran |
| 2007/0182663 A1 | 8/2007 | Biech |
| 2008/0150901 A1 | 6/2008 | Lowles |
| 2008/0150913 A1 | 6/2008 | Bell et al. |
| 2009/0002339 A1 | 1/2009 | Reynolds et al. |
| 2009/0161051 A1 | 6/2009 | Fukunaga et al. |

OTHER PUBLICATIONS

"U.S. Appl. No. 12/854,174, Accelerated Examination Support Document mailed Aug. 11, 2010", 45 pgs.

(Continued)

*Primary Examiner* — Kevin M Nguyen
(74) *Attorney, Agent, or Firm* — Schwegman, Lundberg & Woessner, P.A.

(57) ABSTRACT

A device with a touchscreen with a light modulator is disclosed herein. The device transitions from a netbook mode to a touchscreen mode. The device comprises a main unit and a touchscreen unit with a transparent display. The touchscreen unit is preferably separated from the main unit when in a netbook mode, and the touchscreen unit communicates wirelessly with the main unit. The touchscreen unit preferably has an outer screen display surface and an inner screen display surface on each side of a light modulating unit. The main unit preferably has a main unit display.

21 Claims, 14 Drawing Sheets

(56) References Cited

OTHER PUBLICATIONS

"U.S. Appl. No. 12/854,174, Pre-Examination Support Document mailed Aug. 11, 2010", 21 pgs.

"U.S. Appl. No. 12/854,174, Updated Accelerated Examination Support Document mailed Oct. 23, 2010", 35 pgs.

"U.S. Appl. No. 12/983,212, Notice of Allowance mailed Dec. 10, 2012", 5 pgs.

"U.S. Appl. No. 12/854,174, Non Final Office Action mailed Sep. 24, 2010", 12 pgs.

"U.S. Appl. No. 12/854,174, Non Final Office Action mailed Nov. 4, 2010", 11 pgs.

"U.S. Appl. No. 12/854,174, Notice of Allowance mailed Dec. 14, 2010", 7 pgs.

"U.S. Appl. No. 12/854,174, Response filed Oct. 23, 2011 to Non Final Office Action mailed Sep. 24, 2010", 13 pgs.

"U.S. Appl. No. 12/983,212, Notice of Allowance mailed Aug. 17, 2012", 9 pgs.

\* cited by examiner

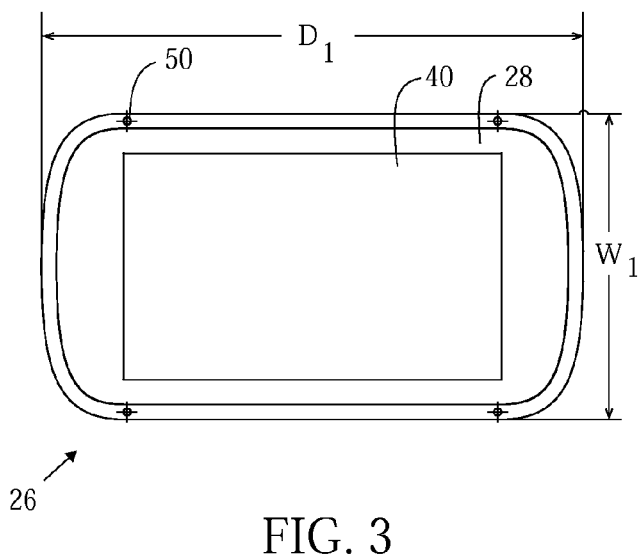
FIG. 3
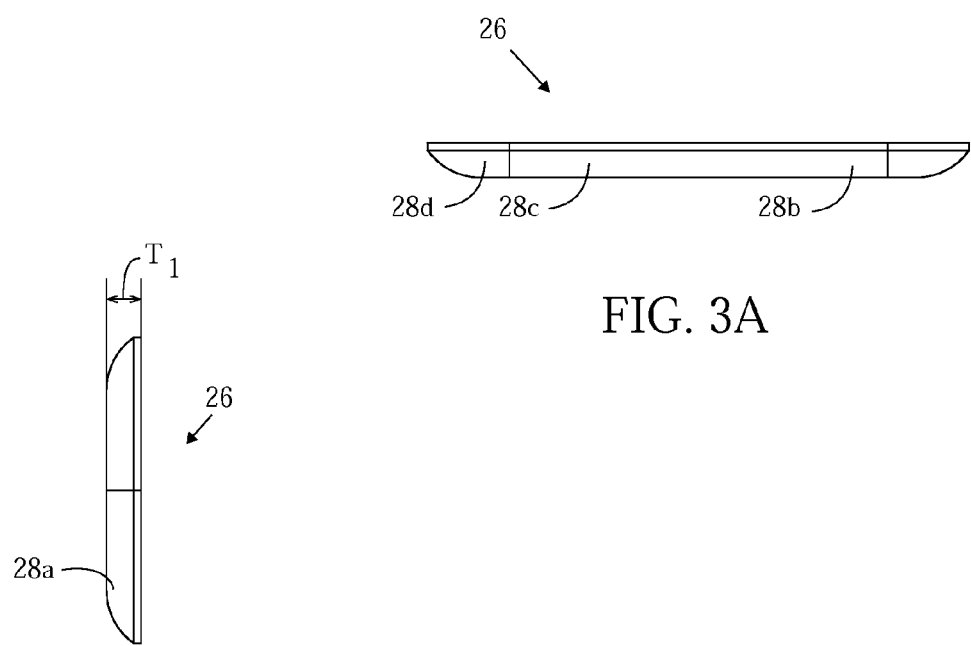
FIG. 3A
FIG. 3B

TOUCHSCREEN WITH A LIGHT MODULATOR

CROSS REFERENCE TO RELATED APPLICATION

The Present application is a continuation application of U.S. patent application Ser. No. 12/983,212, filed Dec. 31, 2010 which is a continuation application of U.S. patent application Ser. No. 12/854,174, filed on Aug. 11, 2010, and claims priority to U.S. Provisional Patent Application No. 61/331, 395, filed on May 5, 2010, all of which are hereby incorporated by reference.

STATEMENT REGARDING FEDERALLY SPONSORED RESEARCH OR DEVELOPMENT

Not Applicable

BACKGROUND OF THE INVENTION

1. Field of the Invention

The present invention generally relates to touchscreens. More specifically, the present invention relates to a touchscreen with a light modulator.

2. Description of the Related Art

Generally speaking, the tablet input paradigm attempts to mimic the direct interaction of a human finger with a piece of paper: touching and dragging the screen causes the underlying image to move as if it were a piece of paper being touched and dragged. This, combined with gesture-based cues to zoom, advance, etc. creates a vocabulary for a user interface paradigm.

However, this vocabulary is at odds with the classic keyboard-and-mouse interface paradigm. The most obvious issue is that on a tablet device, there is no keyboard. While it is trivial to add a real keyboard to a tablet device, doing so destroys the illusion of using the device like a book. Thus, most tablet devices opt to emulate a virtual keyboard when textual input is necessary. Doing so, however, requires the screen real-estate to be split with the keyboard, greatly reducing the viewable area of content.

A less obvious issue, but perhaps more severe, is that on a tablet device, there is no cursor; the user's finger alone is a pointing device. While this behavior is more intuitive in the context of the book illusion, it is incompatible with user interface notions that take advantage of contextual mouse-cursor location, such as hover-menus and context-tips. This problem is particularly pronounced when using web content: for example, the popular on-line TV website Hulu uses a hover-context UI to present a menu of channel selections. While Apple is on a campaign to eliminate this UI paradigm from the Internet, as well as Flash as a standard rich media format, it's questionable if they will be successful in such an endeavor.

BRIEF SUMMARY OF THE INVENTION

The present invention provides a solution to the problem of the prior art. The touchscreen with a light modulator of the present invention resolves the input mode dichotomy by allowing a user to have both a true tablet device, free of any extra keyboard surface, and a keyboard/mouse input device (referred to as a netbook device herein) without sacrificing any active screen real estate during netbook mode.

The core invention is a transparent touchscreen that embeds a film or cell whose transparency or emissivity can be modulated, typically through an electrical signal. In one embodiment, the modulated pattern may be that of a keyboard layout. This touchscreen with modulated transparency or emissivity is then typically mounted on hinge, pivot, or slide such that during certain modes of modulation, the touchscreen with modulated transparency is no longer directly over the active display area and is instead off to the side, allowing a user to interact with the touchscreen area independently of the active display area.

During netbook mode, the device may use a variety of haptic or auditory cues to improve the illusion of using a traditional mechanical-switch based keyboard. For example, when a keyboard press is detected, the device may activate a transducer that vibrates the touchscreen and also emit a sound, perhaps as a keyclick sound, to indicate a key press. In addition, the keyboard image inside the touchscreen may also modulate its state to indicate the key that is pressed.

One aspect of the present invention is a device comprising a touchscreen unit and a main unit. The touchscreen unit includes a housing, a touchscreen component, a first H polarizer layer, a light modulator component, a first V polarizer layer, a second touchscreen component, and a first wireless communication component. The housing has a first magnetic mating surface. The first touchscreen component is positioned on an exterior surface. The first touchscreen is composed of a transparent material and utilizes interactive touch technology. The first H polarizer layer is adjacent the first touchscreen component. The light modulator component is adjacent the first H polarizer layer. The light modulator component is selected from an embedded film, a twisted nematic liquid crystal cell, electrochromic glass, an interferometric modulator, or an organic light emitting diode display. The first V polarizer layer is adjacent the light modulator component. The first wireless communication component is selected from one of a BLUETOOTH wireless component, a radiofrequency component utilizing an 802.11 communication format, or a 2.5 gigahertz radiofrequency component. The light modulator is in light communication with the first touchscreen and the second touchscreen. The main unit is removably connected to the first unit. The main unit includes a housing, a protective layer composed of a polycarbonate material, a second V polarizer layer adjacent the protective layer, a liquid crystal display adjacent the V polarizer layer, a second H polarizer layer adjacent the liquid crystal display, a backlight and reflector layer adjacent the H polarizer, a second wireless communication component, a microSD FLASH memory, a CPU unit and a Lithium ion battery. The housing has a second magnetic mating surface composed of ferrous material for mating with the first magnetic mating surface and providing power to the first unit. The second wireless communication component is selected from one of a BLUETOOTH wireless component, a radiofrequency component utilizing an 802.11 communication format, or a 2.5 gigahertz radiofrequency component, the second wireless communication component communicating with the first wireless component. The device operates in a tablet mode when the first unit is in a closed position with the main unit, and the device operates in a netbook mode when the first unit is in an open position with the main unit. The device has auditory interactive feedback and haptic interactive feedback.

Another aspect of the present invention is a "conversion-tablet", where the touchscreen, when folded over the display LCD, works as a standard, transparent tablet-like touchscreen. However, the touchscreen is on a hinge and can flip open. When opened, a secondary black and white LCD buried inside the touchscreen is activated. This causes a pattern of keys to "appear" on the transparent touchscreen. The other side of the touchscreen then serves as the active surface, thus allowing you to use the same piece as a keyboard, closer to a "netbook" form of operation.

Another aspect of the present invention is device comprising a first unit and a main unit. The first unit includes a housing, a first touchscreen component, a first H polarizer layer, a light modulator component, a first V polarizer layer, a Hall effect sensor, and a first wireless communication component. The housing is preferably composed of a thixomolded magnesium material and has a first magnetic mating surface composed of ferrous material. The first touchscreen component is on an exterior surface of the first unit. The first touchscreen component is composed of a transparent material. The first touchscreen component utilizes resistive touch technology, capacitive touch technology, proximity touch technology, surface acoustic wave touch technology, or infrared touch technology. The first H polarizer layer is adjacent the first touchscreen component. The light modulator component is adjacent the first H polarizer layer. The light modulator component is selected from an embedded film, a twisted nematic liquid crystal cell, electrochromic glass, an interferometric modulator, or an organic light emitting diode display. The first V polarizer layer is adjacent the light modulator component. The interior surface of the first unit has an optional second touchscreen component. The first wireless communication component is selected from one of a BLUETOOTH wireless component, a radiofrequency component utilizing an 802.11 communication format, or a 2.5 gigahertz radiofrequency component. The light modulator is in light communication with the first touchscreen and the optional second touchscreen. The main unit is removably attached to the first unit. The main unit comprises a housing, a protective layer composed of a polycarbonate material, a second V polarizer layer adjacent the protective layer, a liquid crystal display adjacent the V polarizer layer, a second H polarizer layer adjacent the liquid crystal display, a backlight and reflector layer adjacent the H polarizer, a microSD FLASH memory, a CPU unit, a Lithium ion battery, and a second wireless component. The housing has a second magnetic mating surface composed of ferrous material for mating with the first magnetic mating surface and providing power to the first unit. The second wireless communication component is selected from one of a BLUETOOTH wireless component, a radiofrequency component utilizing an 802.11 communication format, or a 2.5 gigahertz radiofrequency component. The second wireless communication component communicates with the first wireless component. The device also has means for connecting the first unit to the main unit selected from slidable attachment, hinge attachment, or magnetic attachment. The device operates in a tablet mode when the first unit is in a closed position with the main unit, and the device operates in a netbook mode when the first unit is in an open position with the main unit. The device has auditory interactive feedback and haptic interactive feedback such as when a keyboard pattern is depressed by a user, the device activates a transducer that vibrates the touchscreen and also emits a sound such as a keyclick sound, to indicate a key press. In addition, the keyboard image inside the touchscreen may also modulate its state to indicate the key that is pressed by the user.

A preferred embodiment is a sandwich of an outer touchscreen, an LCD cell (sans reflector and backlight to allow it to be transparent when off), and an inner touchscreen. An alternative embodiment is to use the actual glass of the LCD cell itself as part of the touchscreen element. Further, the touch element is preferably an Infrared touchscreen. Alternatively, the touch element is a capacitive touchscreen. However, those skilled in the pertinent art will recognize that any touch technology for touchscreens may be used without departing from the scope and spirit of the present invention.

A most preferred embodiment utilizes haptic and/or auditory feedback to improve the feel of the keyboard during use. A vibration response to touching of the screen is one embodiment of haptic feedback to a user. Other touch sensations may be used with the present device. One embodiment of auditory feedback is a tone to indicate touching of the touchscreen display surface. Further, the most preferred embodiment incorporates "bleed" (off-screen) elements of the touchscreen as mouse and live buttons.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 3 is an isolated top view of a main unit of a device of the present invention.

FIG. 3A is an isolated front view of a main unit of a device of the present invention.

FIG. 3B is an isolated side view of a main unit of a device of the present invention.

DETAILED DESCRIPTION OF THE INVENTION

Figure 1:
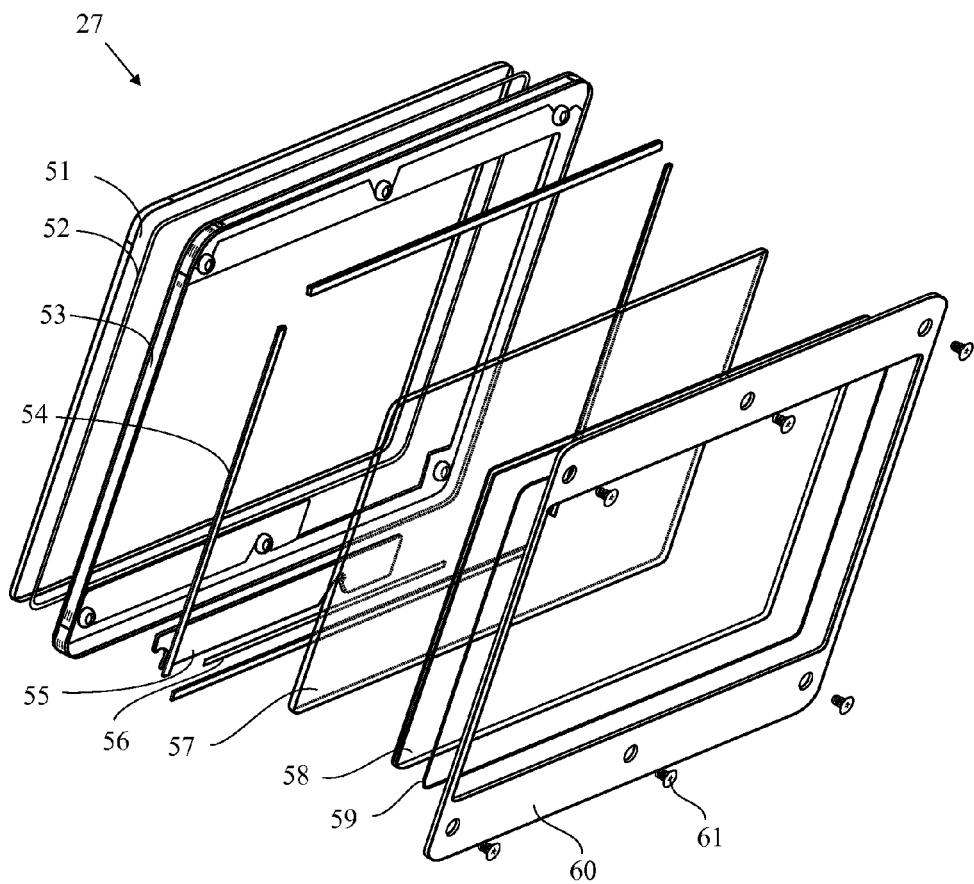
FIG. 1 is an exploded view of a touchscreen unit of a device of the present invention.

An exploded view of a preferred embodiment of a touchscreen unit 27 of a device 25 is shown in FIG. 1. The touchscreen unit 27 preferably comprises a touchscreen surface 51, a first VHB adhesive 52 for attaching the touchscreen surface 51 to a main body 53, a sensor LED 54, a main PCBA 55, an elastomeric connector 56, a liquid crystal cell 57, a protective surface element 58 adhered with a second VHB adhesive 59 to a protective plate 60, wherein a plurality of screws 61 are threaded through a plurality of apertures to connect the components of the touchscreen unit 27.

Figure 2:
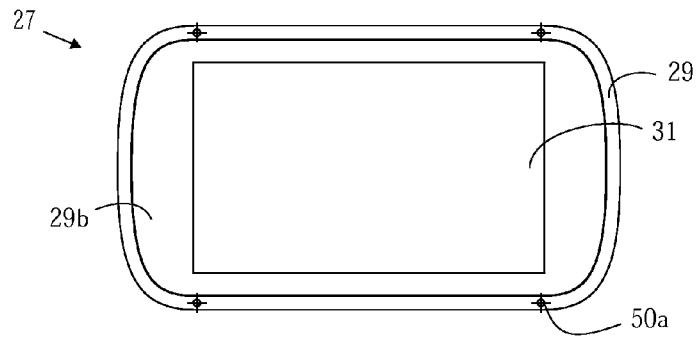
FIG. 2 is an isolated top view of a touchscreen unit of a device of the present invention.
Figure 2A:
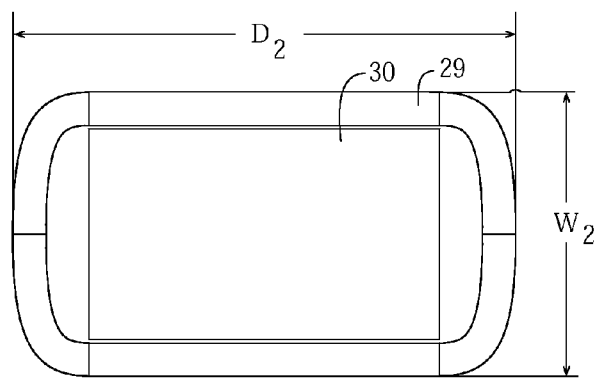
FIG. 2A is an isolated bottom view of a touchscreen unit of a device of the present invention.
Figure 2B:
FIG. 2B is an isolated front view of a touchscreen unit of a device of the present invention.
Figure 2C:
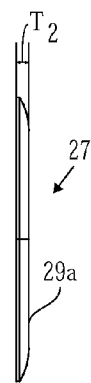
FIG. 2C is an isolated side view of a touchscreen unit of a device of the present invention.

FIGS. 2, 2A, 2B and 2C illustrate various isolated views of the touchscreen unit 27. The touchscreen unit 27 preferably has a thickness T2, as shown in FIG. 2C that ranges from 4 millimeters ("mm") to 10 mm, more preferably from 5 mm to 8 mm, and most preferably 6 mm. The touchscreen unit 27 preferably has a width W2 that ranges from 100 mm to 200 mm, more preferably from 110 mm to 150 mm, and most preferably 120 mm to 135 mm. The touchscreen unit 27 preferably has a length D2 that ranges from 180 mm to 300 mm, more preferably from 190 mm to 260 mm, and most preferably from 210 mm to 230 mm. The touchscreen unit 27 has a housing 29, an outer touchscreen display 30 and an inner touchscreen display 31. The housing 29 is preferably composed of a thixomolded magnesium material to provide lightweight strength and durability. The touchscreen unit 27 also preferably has a magnetic mating surface 50*a* for engaging a main unit 26 of the device 25 and for charging a battery of the touchscreen unit 27. A radiofrequency ("RF") communication component, a battery, LCD driver and integrated circuit electronics for the touchscreen unit 27 are preferably placed within the housing 29 at a region 29*b*, as shown in FIG. 2. An outer surface the touchscreen unit 27 preferably has a polycarbonate or acrylic IR multi-touch surface that extends beyond the outer touchscreen display 30, preferably for a mouse function. The inner surface of the touchscreen unit 27 also preferably has a protective polycarbonate sheet.

FIGS. 3, 3A and 3B illustrate various isolated views of the main unit 26 of the device 25. The main unit 26 preferably has a thickness T1, as shown in FIG. 3B that ranges from 8 mm to 25 mm, more preferably from 10 mm to 20 mm, and most preferably 14 mm. As shown in FIG. 3, the main unit 26 preferably has a width, W1, that ranges from 100 mm to 200 mm, more preferably from 110 mm to 150 mm, and most preferably 120 mm to 135 mm. The main unit 26 preferably has a length, D1, that ranges from 180 mm to 300 mm, more preferably from 190 mm to 260 mm, and most preferably from 210 mm to 230 mm. The main unit 26 has a housing 28 and a LCD display 40. The housing 28 is preferably composed of a thixomolded magnesium material to provide lightweight strength and durability. The housing 28 of the main unit 26 also preferably has a magnetic mating surface 50 for engaging and for charging a battery of the touchscreen unit 27. As shown in FIG. 3B, a region 28*a* is preferably composed of an ABS plastic material to allow for transmissions from a RF antenna location within the housing 28 in this region 28*a*.

As shown in FIG. 3A, a region 28*b* is a magnesium casing region of the housing 28, a region 28*c* is a location of a battery, and a region 28*d* is a region of the electronics for the main unit 26.

Figure 4:
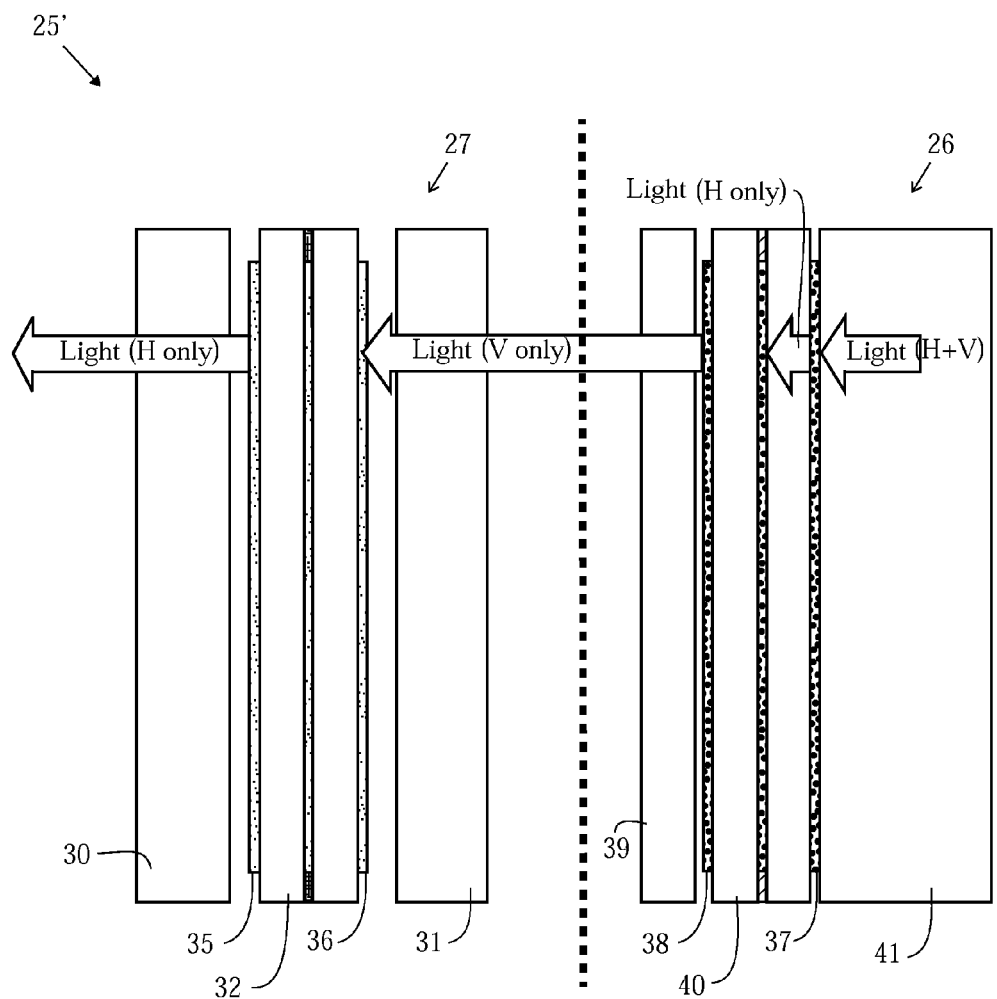
FIG. 4 is a schematic of a light path of a preferred embodiment of a device of the present invention.

An architecture of a preferred embodiment of the device 25' is shown in FIG. 4 to demonstrate the light path. The touchscreen unit 27 preferably includes the outer touchscreen display 30, an H polarizer layer 35, the light modulator unit 32, a V polarizer layer 36 and the inner touchscreen display 31. The main unit 26 preferably includes a backlight and reflector element 41, a second H polarizer layer 37, the LCD display 40, a second V polarizer layer 38 and a protective layer 39. The aligned polarization results in low-loss transmission through the light modulator unit 32. A vertically polarized ("V") optical wave is one for which the electric field is restricted to lie along the z-axis for a wave propagating along the x-axis, and a horizontally polarized ("H") optical wave is one in which the electric field lies along the y-axis. Light is generated at the backlight and reflector element 41. The second H polarizer layer 37 polarizes H light into the LCD display 40. The second V polarizer 38 polarizes V light into the inner touchscreen display 31. The first H polarizer layer 35 polarizes H light only.

Figure 4A:
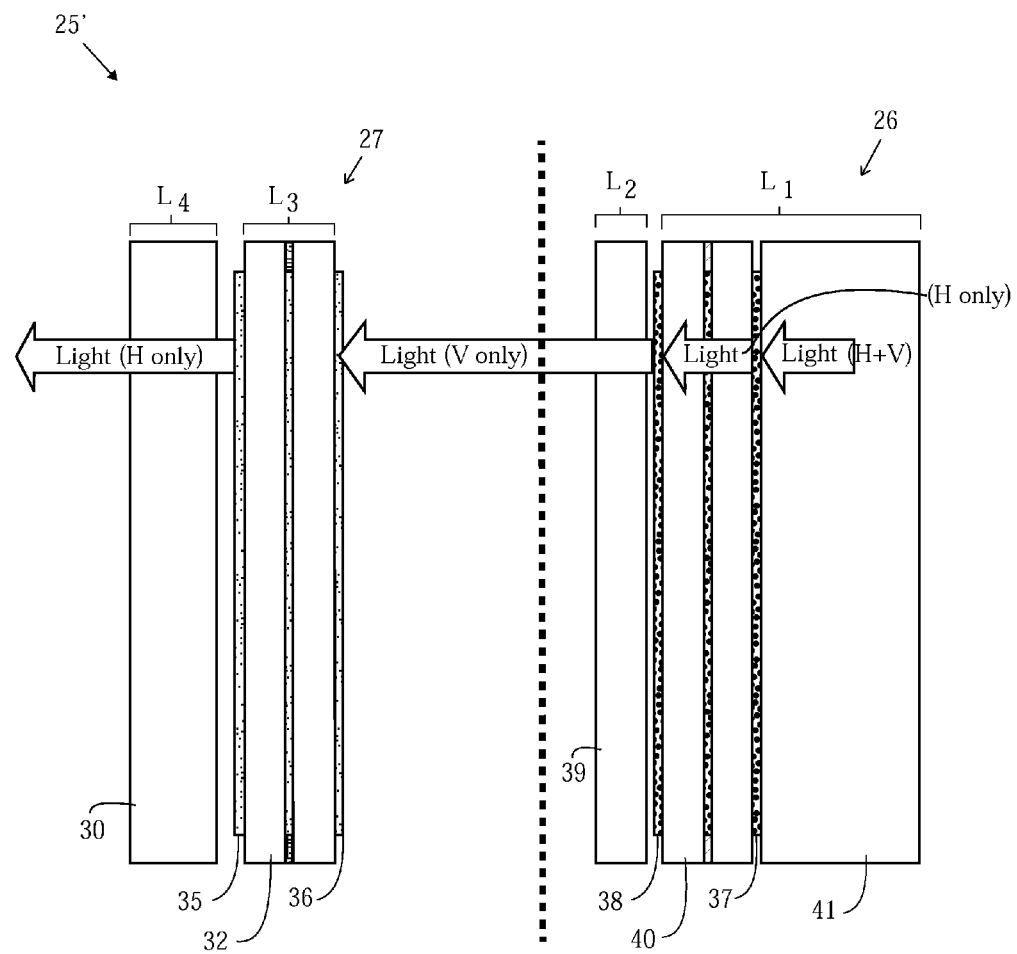
FIG. 4A is a schematic of a light path of an alternative embodiment of a device of the present invention.

An architecture of an alternative embodiment of the device 25' with a single-sided touch screen is shown in FIG. 4A to demonstrate the light path. The touchscreen unit 27 preferably includes the outer touchscreen display 30, an H polarizer layer 35, the light modulator unit 32 and a V polarizer layer 36. A length L4 of the touchscreen unit 27 preferably ranges from 1-2 mm and a length L3 preferably ranges from 1.5-2 mm. The main unit 26 preferably includes a backlight and reflector element 41, a second H polarizer layer 37, the LCD display 40, a second V polarizer layer 38 and a protective layer 39. A length L2 of the main unit 26 preferably ranges from 1-2 mm, and a length L1 preferably ranges from 3-10 mm. The aligned polarization results in low-loss transmission of light through the light modulator unit 32. Preferably in this embodiment the first V polarizer layer 38 is aligned with the second V polarizer layer 36. Light is generated at the backlight and reflector element 41. The second H polarizer layer 37 polarizes H light into the LCD display 40. The second V polarizer 38 polarizes V light into the inner touchscreen display 31. The first H polarizer layer 35 polarizes H light only.

Figure 4B:
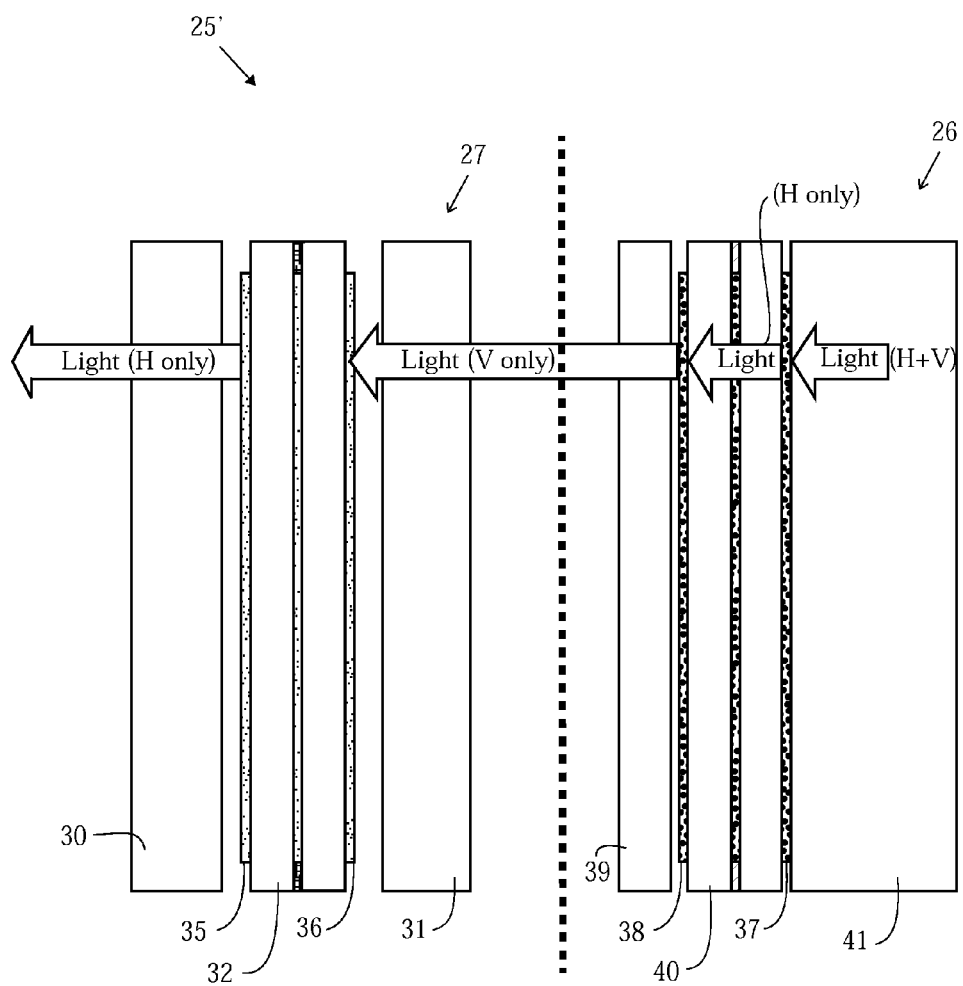
FIG. 4B is a schematic of a light path of a preferred embodiment of a device of the present invention.

An architecture of an alternative embodiment of the device 25' is shown in FIG. 4B to demonstrate the light path. The touchscreen unit 27 preferably includes the outer touchscreen display 30, an H polarizer layer 35, the light modulator unit 32, a V polarizer layer 36 and the inner touchscreen display 31. The main unit 26 preferably includes a backlight and reflector element 41, a second H polarizer layer 37, the LCD display 40, a second V polarizer layer 38 and a protective layer 39. The aligned polarization results in low-loss transmission through the light modulator unit 32. Light is generated at the backlight and reflector element 41. The second H polarizer layer 37 polarizes H light into the LCD display 40. The second V polarizer 38 polarizes V light into the inner touchscreen display 31. The first H polarizer layer 35 polarizes H light only.

In a preferred embodiment of the invention, the liquid cell that modulates the light is a twisted nematic liquid crystal cell 57 that lacks the traditional rear reflector or backlight array. Such a twisted nematic liquid crystal cell 57 is normally transparent to one polarization of light, and when an electrical signal is applied to its electrodes, a dark pattern appears wherever the electrode are exposed to the underlying liquid cell material. The liquid cell 57 preferably has individually addressed electrodes or a matrix-addressed system, and optionally incorporates a TFT mechanism for the matrix addressing. Preferably, the liquid crystal cell 57 is aligned to the active content display to optimize light transmission. In the case that the active content display is itself a liquid-crystal display element, the liquid crystal cell 57 has its input polarization aligned to the output polarization of the active content display.

Note that while this exemplary embodiment of the invention will refer to a liquid crystal light modulator, those skilled in the pertinent art will recognize that any light modulator or emitter could be used, including but not limited to electrochromic glass (coated glass that can change transparency in the presence of high voltage) or interferometric modulators (films that can be adjusted to cause interference at certain wavelengths). Transparent, emissive elements may also be used in place of the light modulator, in which case the element is a light emitting element. An example of such an element would be a transparent OLED display. Such an element would have the advantage of being usable in the dark and on low-contrast surfaces, but has the disadvantage of being expensive and currently having relatively low transparency in the off state. However, as such technology improves it is an excellent candidate to replace the liquid crystal cell cited as the common example in this paper.

In one embodiment of the invention, the embedded liquid crystal cell 57 is mated with one or more touch sensitive display surfaces 30 and 31. The touch sensitive display surfaces 30 and 31 use touch technology. Preferred touch technologies utilized include resistive, capacitive, SAW, IR, and proximity. All of the preferred touch technologies have transparent touch sensitive display surfaces 30 and 31. The choice of using one or more touch surfaces depends upon the mechanical integration with the main unit 26 of the device 25.

Figure 5:
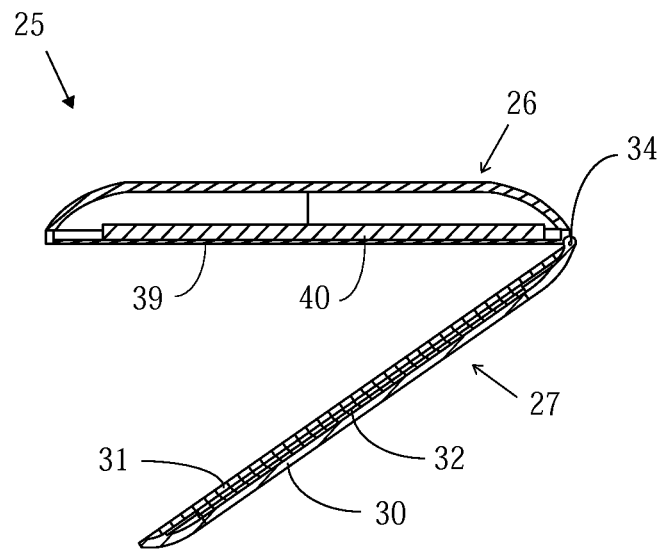
FIG. 5 is a cross-sectional view of a preferred embodiment of a device of the present invention.

As shown in FIG. 5, a device 25 in a "clamshell arrangement" has a hinge 34 that connects the main unit 2 with the touchscreen unit 27. In the clamshell arrangement of the device 25, an inner and outer touch sensitive surface is required, and for touch technologies that require direct contact, two opposing touch surfaces are required. If a proximity sensitive touch technology is used, then it is possible to use only a single touch sensitive surface in this configuration.

Figure 6:
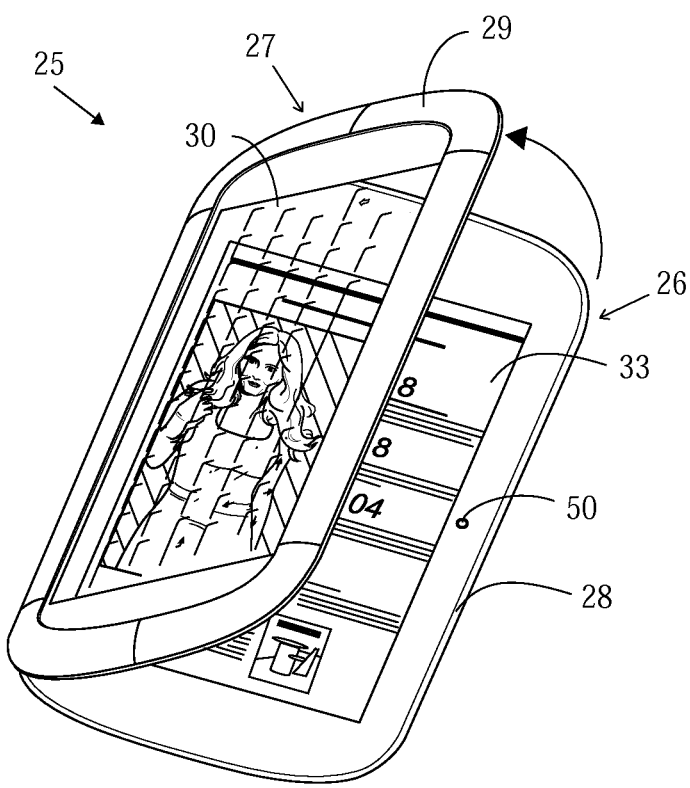
FIG. 6 is a top perspective view of a preferred embodiment of a device with a touchscreen unit open from a main unit of a device.

As shown in FIG. 6, the device 25 is "flipped" open with the transparent display of the touchscreen unit 27 showing a keyboard on the outer touchscreen display 30. The main unit display 33 of the main unit 26 has an image of a woman, which is viewable through the transparent display of the touchscreen unit 27.

If a slide arrangement of the device 25 is used, then just a single touch sensitive display surface 30 of the touchscreen unit 27 is required, as the mechanical integration can present the same surface to users in both tablet and netbook modes.

Figure 7:
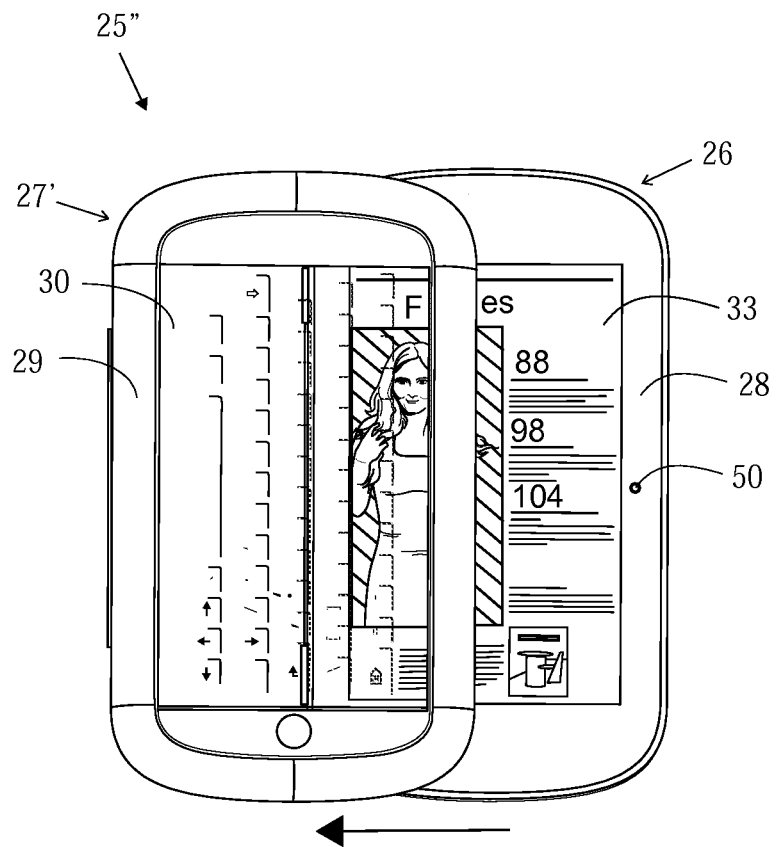
FIG. 7 is a top plan view of an alternative embodiment of a device with a touchscreen unit open from a main unit of a device.

As shown in FIG. 7, once the touchscreen unit 27 is slid down from the main unit 26, the touchscreen unit 27 engages a hinge that also enables a rotation of the touchscreen unit 27 relative to the main unit 26, so that the final configuration looks similar to the "clamshell" arrangement. The slide arrangement embodiment of the device 25 has a more complex mechanical implementation but requires only a single touch sensitive display surface 30 on the touchscreen unit 27.

In one embodiment of the invention, the embedded film or cell that modulates light contains a keyboard pattern on its electrodes. The pattern's segments are individually addressable, such that an individual key element is turned on or off to enable visual clues to the user as to the key-press state.

Figure 8:
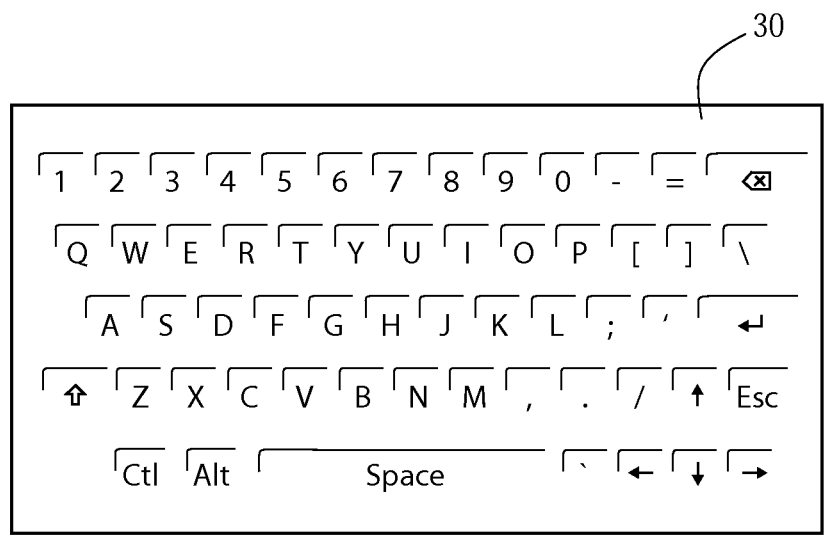
FIG. 8 is an isolated top plan view of a keyboard pattern on a display of a touchscreen unit of a device of the present invention.

As shown in FIG. 8, each segment or set of segments in the keyboard pattern shown in FIG. 8 are individually addressable such that any element or set of elements are independently turned on or off.

Figure 12:
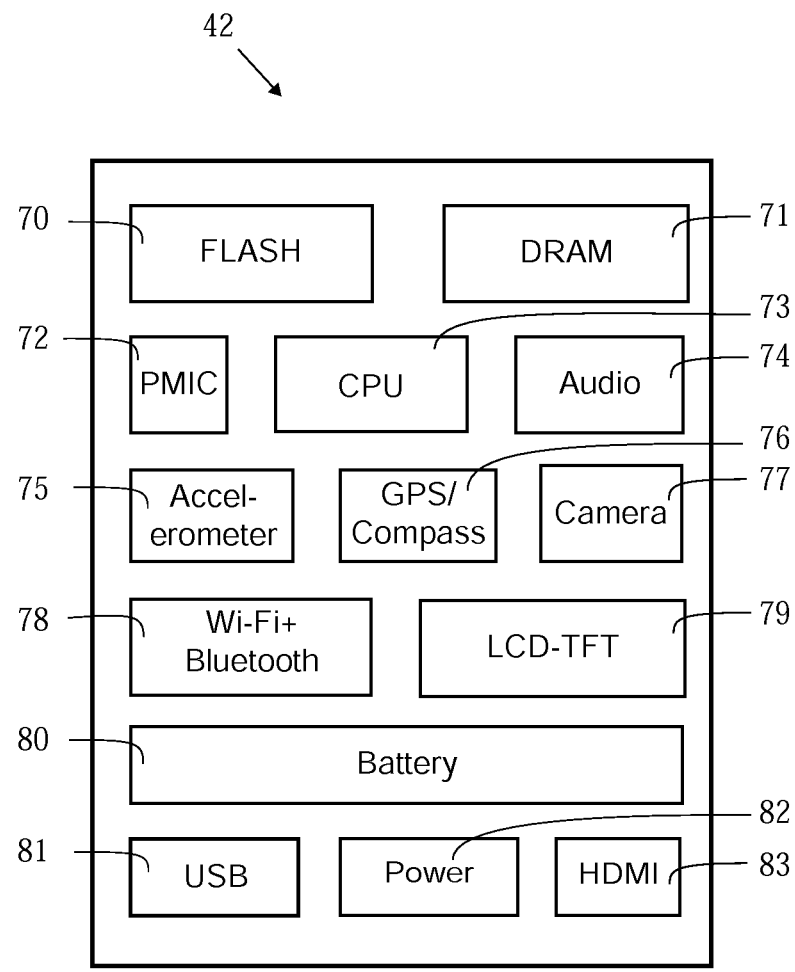
FIG. 12 is a block diagram of components of a device of the present invention.

FIG. 12 is a block diagram of the electronic components of the main unit 26. The electronic components are preferably contained in an electronics compartment 42. The electronic components preferably comprise a microSD FLASH memory 70, DDR3 DRAM memory 71, PMIC 72, a CPU 73 such as a high-speed ARM SoC processor, an audio coded 74, a multiple-axis accelerometer 75, a GPS/compass 76, a camera 77, a WiFi and BLUETOOTH communications component 78, a thin-film transistor LCD 79, a battery 80 such as a lithium polymer battery, a USB connector 81, a power connector 82 and a HDMI connector 83. Those skilled in the pertinent art will recognize that other electronic components may be included without departing from the scope and spirit of the present invention.

Figure 15:
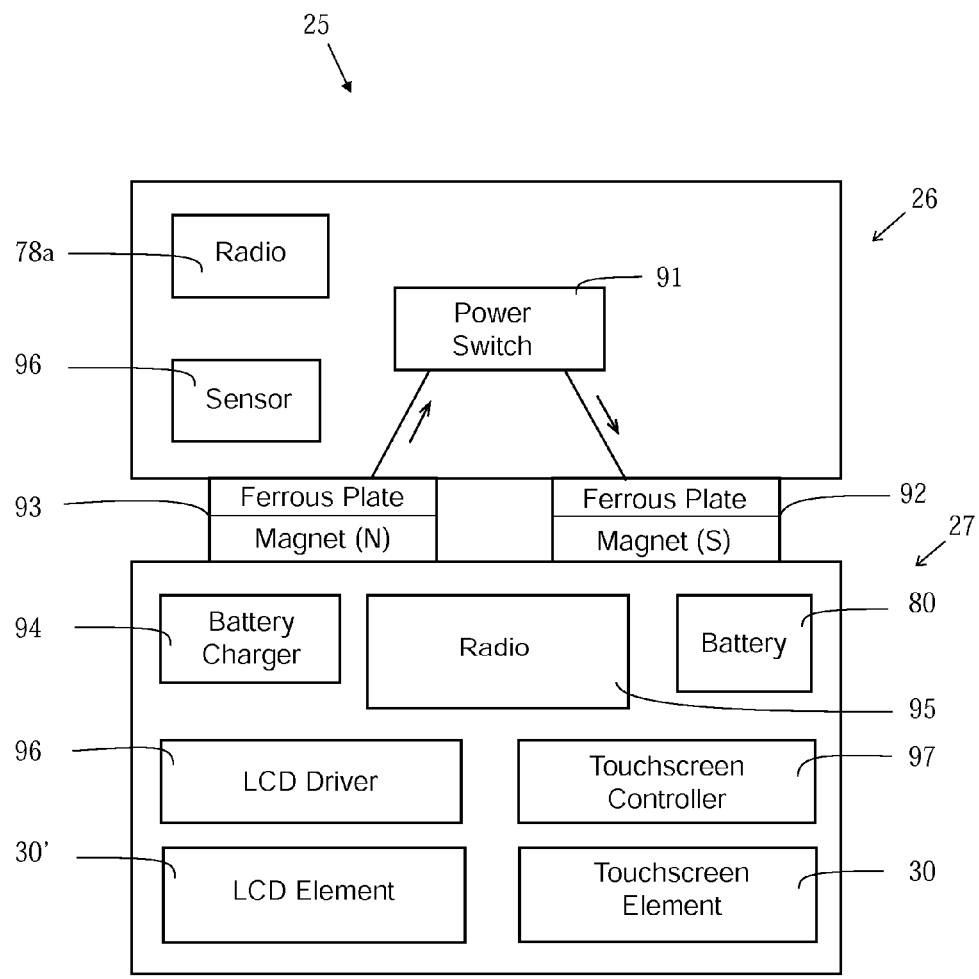
FIG. 15 is a block diagram of components of a device of the present invention.

FIG. 15 is a block diagram of components of the device 25 to illustrate and explain the interaction between the main unit 26 and the touchscreen unit 27. The main unit 26 has a radio interface component 78a which communicates with the radio interface component 95 of the touchscreen unit 27. The radio interface component 78a preferably uses BLUETOOTH, 802.11 communication protocol. Alternatively, the radio interface component 78a uses a NORDIC nRF905 chip. The radio interface component 95 of the touchscreen unit 27 is preferably an integrated chip with an embedded microprocessor. A power switch 91 adjusts the charging polarity of the ferrous plates 92 and 93. Charge is transferred between the main unit 26 and the touchscreen unit 27 using a magnetic coupler, preferably two magnets mating to the ferrous plates 92 and 93. A Hall effect sensor 96 is employed to detect the polarity of the magnetic coupling in case the user places the main unit 26 and the touchscreen unit 27 in the incorrect orientation. The touchscreen unit 27 also comprises a battery charger 94, a single cell lithium polymer battery 80, a TN LCD segment driver 96 (preferably a ROHM BU9799 KV), a touchscreen controller 97 (STM32 or ATMEL captouch), a transparent TN LCD element 30' (preferably a keyboard segment pattern) and a second touchscreen element 30".

The preferred operation modes of the device 25 include: a deactivated mode having both the main unit 26 and the touchscreen unit 27 off and mated together; a tablet operating mode with the main unit 26 on the touchscreen unit 27 off, which allows the touchscreen unit 27 to be charged when both are mated together; and a netbook operating mode with the main unit 26 on and the touchscreen unit 27 on, with both units separated both connected using a wireless link. A keyboard operating mode is a specific netbook mode wherein the touchscreen unit 27 has a keyboard pattern shown and the touchscreen unit 27 is in wireless communication with the main unit 26 or another RF enabled device.

In addition, the pattern in the embedded film contains other elements in addition to the keyboard. For example, the embedded film incorporates hot-buttons and a digital clock face that can be activated in both netbook and tablet modes. The digital clock face can also be active when the device is off, thus providing a convenient time function during standby or off modes.

Alternatively, the pattern in the embedded film contains no fixed pattern at all and instead consists of an array of matrix-addressable dots, preferably actively addressed through thin-film transistor ("TFT") elements, such that arbitrary and dynamic patterns are rendered in the body of the liquid crystal cell. Such an embodiment is useful in games, for example, where a user interface ("UI") unique to the game is rendered on the touchscreen display. Another option for implementing a UI is to provide the user with simply a printed sheet with the UI drawn on the printed sheet. The user then places the printed sheet behind the touchscreen display. In this mode, the light modulator is off, and all UI cues are static, since the source of the UI image is a printed sheet behind the touchscreen display.

In alternative embodiment of the device 25, the contrast bias of the embedded liquid crystal unit 32 is dynamically adjusted depending upon the use mode (netbook or tablet mode) to optimize the viewing angle of the liquid crystal module versus the expected location of the user's eyes.

Figure 9:
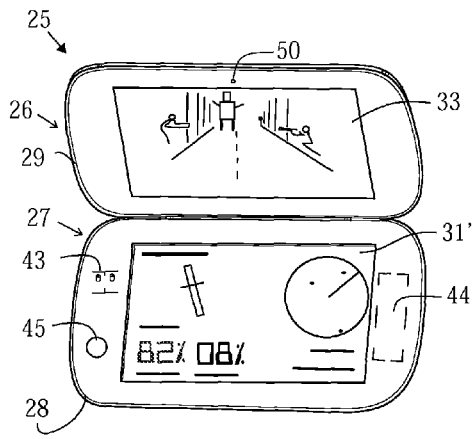
FIG. 9 is a top perspective view of a device of the present invention wherein a light modulator is matrix-addressed, allowing arbitrary graphics to be drawn in which a user interface for a game is being shown in the lower panel.
Figure 11:
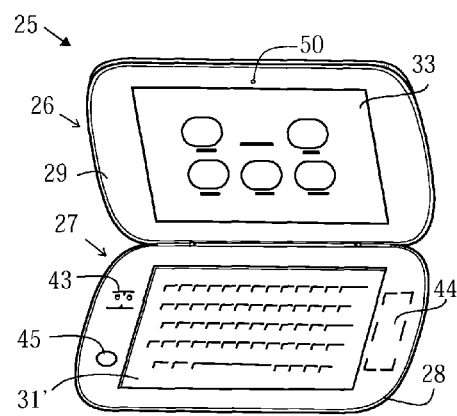
FIG. 11 is a top perspective view of a device of the present invention in a netbook mode.
Figure 10:
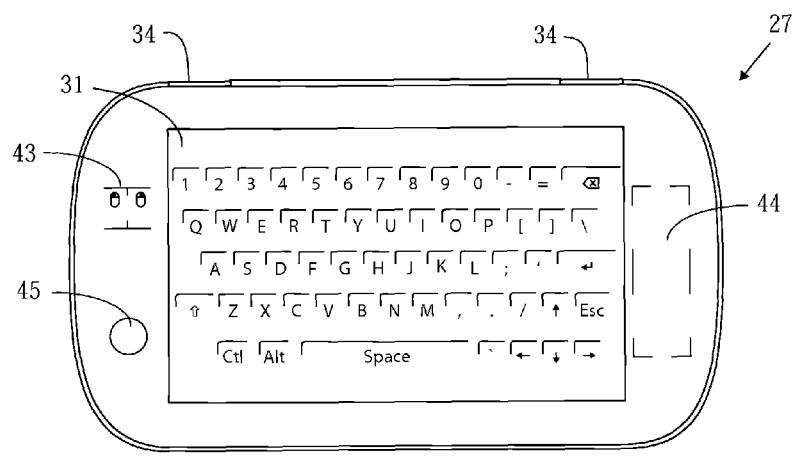
FIG. 10 is an isolated top plan view of a keyboard pattern on a display of a main unit of a device of the present invention.

In an alternative embodiment of the device 25, as shown in FIGS. 9-11, the touchscreen unit 27 has a touch-sensitive area to serve the role of a mouse 44, mouse buttons 43, control button 45, and other input elements. The touch-sensitive area in some cases extends beyond the viewable area of the inner touchscreen display 31, such that the UI elements are preferably placed in an area outside of a transparent area of the touchscreen unit 27.

In one embodiment of the invention, the touchscreen with light Modulator may be paired with a light-colored insert that is designed into the case of the device, such that the device may be more easily used when placed on a surface that offers low contrast to the pattern inside the touchscreen. The insert is designed such that does not interfere with the screen when in tablet mode.

In an alternative embodiment of the device 25, edge-lighting is used on the light modulating unit 32. The edge-lighting is used to improve the contrast of the device on all surfaces and enable the use of the device in dark or poorly-lit conditions.

In one embodiment of the invention, the glass or clear plastic plates used to encapsulate the liquid crystal modulation element used as the light modulating media can also be used as the touch sensitive surface. Instead of incorporating physically distinct touch-sensitive elements, the touch element is integrated into the light modulating element itself, thereby reducing thickness and cost. The actual mechanism for doing this varies depending upon the touch technology desired, and examples are set forth below.

In the case of resistive touch, the outer polarizing films over the light modulator unit 32 are coated with indium tin oxide ("ITO") and then an additional clear film treated with ITO is overlaid with a small gap, thereby creating a typical two-film resistive touchscreen.

In the case of capacitive touch, the outer film or glass of the light modulator unit 32 has an ITO pattern applied that allows the projection of the capacitive sensing touch field.

In the case of infrared touch, the outer film or glass of the light modulator unit 32 is edge-lit by modulated infrared light sources and surrounded by detectors, such that direct contact with the film or glass disrupts the total internal reflection of the infrared ("IR") signal thereby creates a measurable touch signature.

In an alternative embodiment of the device 25, a signal relaying the orientation and physical configuration of the device 25 is relayed to the operating system, such that the host OS on the device 25 automatically reconfigures the device 25 between the two modes of operation. The signal relaying orientation and physical configuration is derived from any number of cues, including but not limited to accelerometer readings, physical switch readings, and magnetic hall switch readings.

Figure 13:
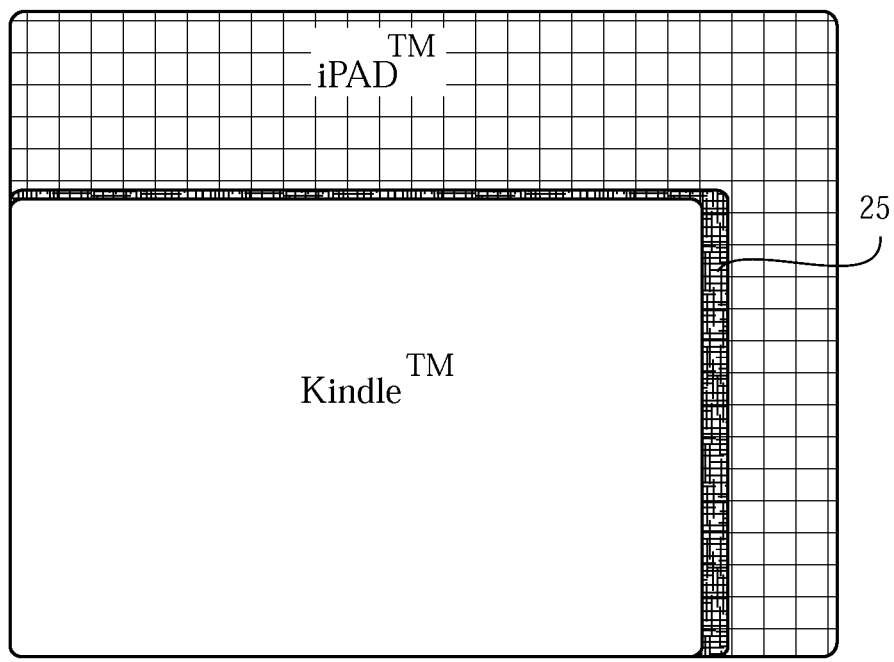
FIG. 13 is a top plan view of a comparison of a device of the present invention, a KINDLE™ device from Amazon, Inc., and an IPAD™ device from Apple, Inc.
Figure 13A:
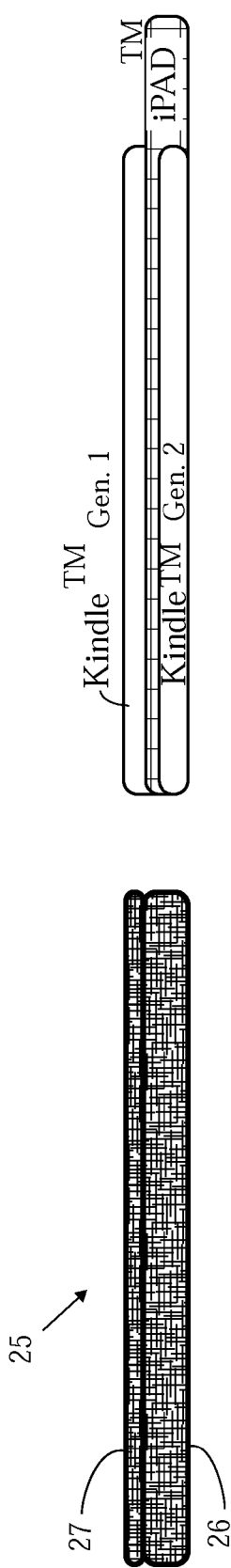
FIG. 13A a side view of a comparison of a device of the present invention, a KINDLE™ device from Amazon, Inc., and an IPAD™ device from Apple, Inc.

As shown in FIGS. 13 and 13A, the device 25 is preferably smaller in area than an IPAD™ device from Apple, Inc., and slightly larger than a KINDLE™ device from Amazon, Inc. Further, the device 25 is preferably thicker than the IPAD™ device from Apple, Inc., and the second generation KINDLE™ device from Amazon, Inc., but slightly thinner than a first generation KINDLE™ device from Amazon, Inc.

Figure 14:
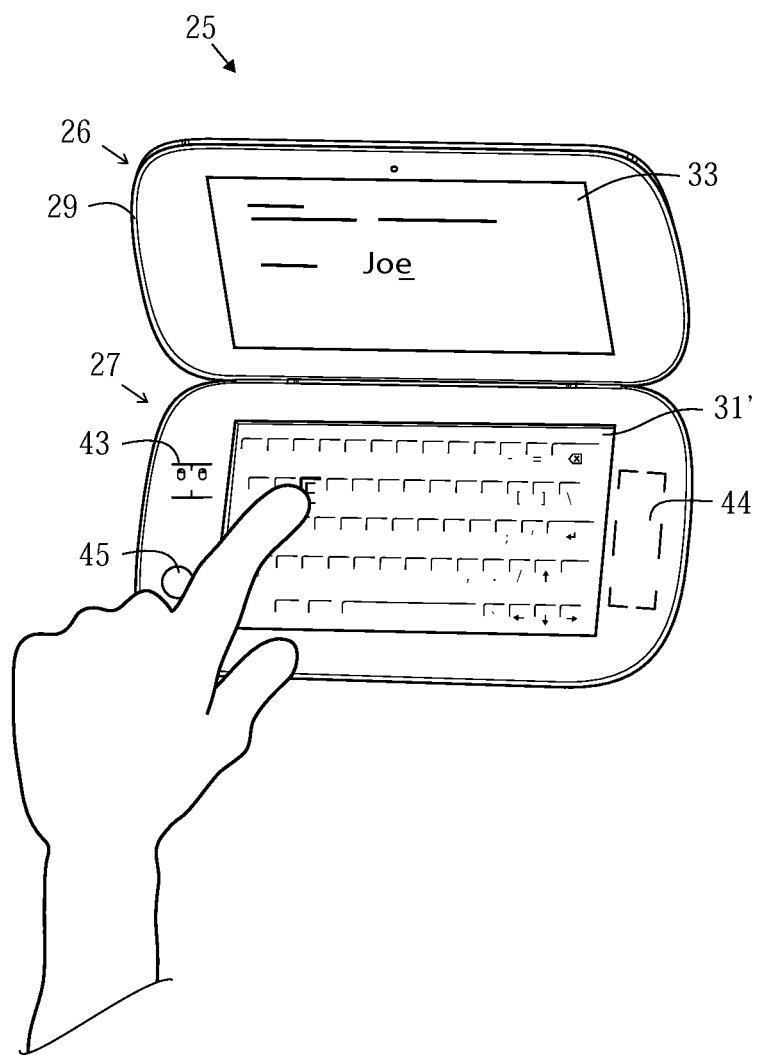
FIG. 14 is a top perspective view of a user using a device of the present invention.

As shown in FIG. 14, a user uses a finger to touch the inner screen display 31 of the touchscreen unit 27 to type out a word, JOE, that is displayed on the main unit display 33 of the main unit 26.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A computing device comprising:
   a first portion including a display unit having a first inner touchscreen disposed on an inner surface and a second outer touchscreen disposed on an outer surface opposite of the inner surface, the display unit having a light modulator positioned between the first inner touchscreen and the second outer touchscreen, and the light modulator in light communication with the first inner touchscreen and the second outer touchscreen; and
   a second portion hingedly attached to the first portion, the second portion providing a touch-actuated keyboard having a plurality of designated keys and a touch-sensitive input area on a surface thereof;
   wherein the computing device operates in a tablet mode providing use of an on-screen keyboard displayed on the second outer touchscreen when the first portion is in a closed position respective to the second portion, and wherein the computing device operates in a netbook mode providing use of the touch-actuated keyboard when the first portion is in an open position respective to the touch-actuated keyboard.

2. The computing device of claim 1, wherein the light modulator disposed between the first inner touchscreen and the second outer touchscreen is modulated by an electrical signal.

3. The computing device of claim 1, wherein the light modulator is one of: an embedded film, a cell, a twisted nematic liquid crystal cell, an interferometric modulator, an electrochromic glass, or an organic light emitting diode display.

4. The computing device of claim 1, wherein the first inner touchscreen and the second outer touchscreen each include a liquid crystal display (LCD) cell display, and wherein the display unit includes a backlight and a reflector element configured to generate light for both of the LCD cell display of the first inner touchscreen and the LCD cell display of the second outer touchscreen.

5. The computing device of claim 1, wherein the second outer touchscreen when in the tablet mode outputs a display identical to the first inner touchscreen when in the netbook mode.

6. The computing device of claim 1, further comprising a sensor used to generate a signal relaying the orientation and physical configuration of the computing device to the operating system.

7. The computing device of claim 6, wherein the signal is generated from one or more of: an accelerometer reading, a physical switch reading, or a magnetic hall switch reading.

8. A computing system, comprising:
- a main unit including a housing and a liquid crystal display touchscreen disposed within the housing, the main unit including a processor and memory within the housing for processing operations of the computing system, and the housing exposing a first magnetic mating surface; and
- a touch-sensitive keyboard unit, the touch-sensitive keyboard unit including a second magnetic mating surface, the touch-sensitive keyboard unit including a touch-sensitive input area and a touch-actuated keyboard with a plurality of designated keys, and the touch-sensitive keyboard unit removably coupled to the main unit with a magnetic coupling between the first magnetic mating surface and the second magnetic mating surface, wherein the touch-sensitive keyboard unit is configured for hingable rotation relative to the main unit during the magnetic coupling;
- wherein during the magnetic coupling, the computing system operates in a tablet mode providing use of an on-screen keyboard displayed with the liquid crystal display touchscreen when the touch-sensitive keyboard unit is in a closed position respective to the main unit, and the computing system operates in a netbook mode providing use of the touch-actuated keyboard of the touch-sensitive keyboard unit when the when the touch-sensitive keyboard unit is in an open position respective to the main unit.

9. The computing system of claim 8, wherein the touch-sensitive input area includes controllable elements serving a role of a mouse and mouse buttons.

10. The computing system of claim 8, wherein the on-screen keyboard displayed on the liquid crystal display touchscreen includes a display of the on-screen keyboard overlaid on a user interface of the computing system.

11. The computing system of claim 8, wherein the liquid crystal display touchscreen utilizes one or more of: resistive touch technology, capacitive touch technology, proximity touch technology, surface acoustic wave touch technology, or infrared touch technology.

12. The computing system of claim 8, wherein the main unit is configured for providing haptic or auditory interactive feedback in connection with use of the on-screen keyboard in the tablet mode.

13. The computing system of claim 8, wherein the first magnetic mating surface includes ferrous material configured for mating with ferrous material of the second magnetic mating surface, the first magnetic mating surface arranged to provide power from the main unit to the touch-sensitive keyboard unit with the magnetic coupling.

14. The computing system of claim 13, the main unit including a sensor employed to detect an incorrect polarity of the power provided via the magnetic coupling, and a power switch to adjust a charging polarity of the magnetic coupling in response to detection of the incorrect polarity of the power provided via the magnetic coupling.

15. The computing system of claim 13, wherein the touch-sensitive keyboard unit includes circuitry powered from the magnetic coupling.

16. A method performed by an electronic computing device, comprising:
- detecting an orientation of a touch-sensitive keyboard unit relative to a main unit of the electronic computing device, wherein the main unit includes a liquid crystal display touchscreen, a housing, and a processor and memory within the housing for processing operations of the electronic computing device, and a first mating surface located on a surface of the housing, and wherein the touch-sensitive keyboard unit includes a plurality of depressable key locations arranged in a keyboard pattern, a touch-sensitive input area, and a second mating surface arranged for coupling to the first mating surface of the main unit;
- changing the electronic computing device to a tablet mode responsive to detecting the orientation of the touch-sensitive keyboard unit in a closed position respective to the main unit during a coupling between the first mating surface and the second mating surface, the tablet mode capturing keyboard input from contact with an on-screen keyboard displayed on the liquid crystal display touchscreen;
- changing the electronic computing device to a netbook mode responsive to detecting the orientation of the touch-sensitive keyboard unit in an open position respective to the main unit during the coupling between the first mating surface and the second mating surface, the netbook mode capturing keyboard input from contact with the depressable key locations of the touch-sensitive keyboard unit; and
- generating keyboard input operations of the electronic computing device based on an active input mode, including the captured keyboard input from the tablet mode and the captured keyboard input from the netbook mode.

17. The method of claim 16, wherein the first touchscreen utilizes one of: resistive touch technology, capacitive touch technology, proximity touch technology, surface acoustic wave touch technology, or infrared touch technology.

18. The method of claim 16, further comprising providing auditory interactive feedback in response to input received on the liquid crystal display touchscreen for the on-screen keyboard.

19. The method of claim 18, wherein the auditory interactive feedback includes a clicking sound when a key of the on-screen keyboard displayed on the liquid crystal display touchscreen is touched by a user.

20. The method of claim 16, further comprising automatically reconfiguring the electronic computing device between the netbook mode and the tablet mode based on a detection of a signal relaying an orientation or physical configuration of the electronic computing device.

21. The method of claim 16, wherein the signal is provided from one or more of:
- reading an accelerometer, reading a physical switch, or reading a magnetic hall.

\* \* \* \* \*

UNITED STATES PATENT AND TRADEMARK OFFICE
CERTIFICATE OF CORRECTION

PATENT NO. : 8,736,569 B2  
APPLICATION NO. : 13/609889  
DATED : May 27, 2014  
INVENTOR(S) : Andrew Shane Huang Page 1 of 1

It is certified that error appears in the above-identified patent and that said Letters Patent is hereby corrected as shown below:

In the Claims
In column 11, line 29, in Claim 8, after "unit", delete "when the", therefor Signed and Sealed this
Twentieth Day of January, 2015

Michelle K. Lee
*Deputy Director of the United States Patent and Trademark Office*